United States Patent [19]
Paterson et al.

[11] Patent Number: 5,585,791
[45] Date of Patent: Dec. 17, 1996

[54] GPWS AUTOPILOT MONITOR

[75] Inventors: Noel S. Paterson, Woodinville; Scott R. Gremmert, Duvall; Gary A. Ostrom, Bellevue, all of Wash.

[73] Assignee: AlliedSignal, Inc., Morristown, N.J.

[21] Appl. No.: 427,028

[22] Filed: Apr. 24, 1995

[51] Int. Cl.$^6$ .................................................. G08B 21/00
[52] U.S. Cl. ........................................... 340/970; 340/963
[58] Field of Search ..................................... 340/970, 963

[56] References Cited

U.S. PATENT DOCUMENTS

| | | | |
|---|---|---|---|
| 4,189,777 | 2/1980 | Kuntman | 340/970 |
| 5,260,702 | 11/1993 | Thompson | 340/970 |

*Primary Examiner*—Glen Swann

[57] ABSTRACT

A warning system for aircraft equipped with an autopilot system having a radio altitude hold (R/A HOLD) function and/or a barometric altitude hold (ALTITUDE HOLD) function monitors the R/A HOLD and ALTITUDE HOLD function control switches, as well as the touch-controlled steering (TCS) control to determine when the functions have been engaged. When either of the R/A HOLD or ALTITUDE HOLD function control switches are selected while the autopilot system is engaged, the system samples the radio altitude or barometric altitude at the moment that the R/A HOLD or ALTITUDE HOLD functions are selected and stores the sample as a reference or datum. The system then compares the current radio altitude or barometric altitude with the datum. Should the actual radio altitude or barometric altitude exceed the datum by a predetermined amount, a warning is generated. In order to prevent spurious warnings, the system is disabled when the touch-control steering is active.

15 Claims, 4 Drawing Sheets

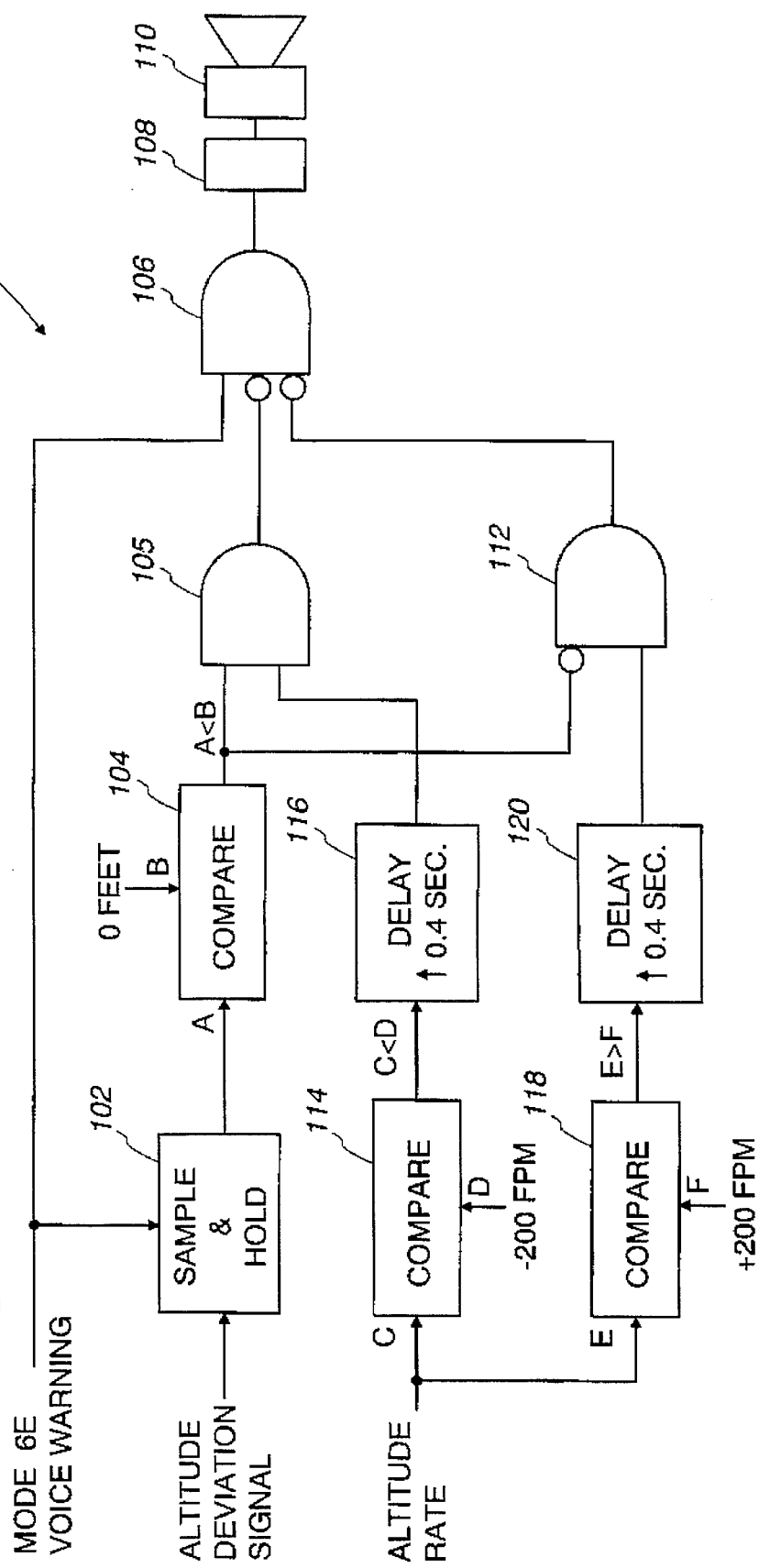

GPWS AUTOPILOT MONITOR

BACKGROUND OF THE INVENTION

1. Field of the Invention

The present invention relates to a warning system for an aircraft and more particularly to a warning system for an aircraft equipped with an autopilot system having a selectable barometric altitude hold and/or radio altitude hold function, which monitors the autopilot system and compares the barometric altitude and terrain clearance, respectively, of the aircraft with the preselected altitude hold values when the autopilot system is engaged and provides a warning when the actual terrain clearance or barometric altitude deviates from the selected values by a predetermined amount.

2. Description of the Prior Art

Autopilot systems for various types of aircraft are known in the art. These autopilot systems vary by aircraft type and are known to include various functions, including a radio altitude or terrain clearance hold (R/A HOLD) function and a barometric altitude hold (ALTITUDE HOLD) function. For example, an autopilot system for a Fokker 50 type aircraft, available from the Honeywell Corporation, includes an R/A HOLD function as well as an ALTITUDE HOLD function. The R/A HOLD function is normally used during low-altitude modes of flight to maintain the terrain clearance level when the autopilot is engaged and either of the R/A HOLD switches (also known as flight directors) is placed in a R/A HOLD mode. The ALTITUDE HOLD function maintains the current barometric altitude when the autopilot system is engaged and one of the ALTITUDE HOLD switches is in an ALTITUDE HOLD mode. The autopilot system provided for the Fokker 50 aircraft also includes a touch-control steering (TCS) system which enables the pilot of the aircraft to adjust the preselected terrain clearance or barometric altitude levels while the autopilot is engaged.

While the R/A HOLD and ALTITUDE HOLD functions are known to adequately maintain preselected terrain clearance or barometric altitude levels, aircraft have been known because of failure to deviate from the preselected levels while the autopilot system is engaged. Unfortunately, while an autopilot system is engaged, pilots are known to have a tendency to rely on the autopilot system. Thus, when the autopilot system is engaged and either an R/A HOLD or ALTITUDE HOLD function is selected, the pilot of an aircraft may be unaware of a hazardous flight condition resulting when the aircraft deviates from the preselected terrain clearance or barometric altitude levels.

SUMMARY

It is an object of the present invention to solve various problems associated with the prior art.

It is yet another object of the present invention to provide a system for aircraft equipped with an autopilot system with a radio altitude hold (R/A HOLD) function which compares the terrain clearance of the aircraft with the preselected terrain clearance level while the autopilot system is engaged and provides a warning when the difference between the terrain clearance and the preselected terrain clearance exceeds a predetermined value.

It is yet a further object of the present invention to provide a system for aircraft equipped with an autopilot system having a barometric altitude hold (ALTITUDE HOLD) function which compares the barometric altitude with the preselected barometric altitude while the autopilot system is engaged and provides a warning when the difference between the barometric altitude and the preselected barometric altitude exceeds a predetermined level.

Briefly, the present invention relates to a warning system for aircraft equipped with an autopilot system having an R/A HOLD function and/or an ALTITUDE HOLD function. The warning system monitors the R/A HOLD and ALTITUDE HOLD function control switches, as well as the touch-controlled steering (TCS) control to determine when the functions have been engaged. When either of the R/A HOLD or ALTITUDE HOLD control switches are selected while the autopilot system is engaged, the system samples the radio altitude or barometric altitude at the moment that the R/A HOLD or ALTITUDE HOLD functions are selected and stores the sample as a reference or datum. The system then compares the current radio altitude or barometric altitude with the datum. Should the actual radio altitude or barometric altitude deviate from the datum by a predetermined amount, a warning is generated. In order to prevent spurious warnings, the system is disabled when the TCS switch is active.

BRIEF DESCRIPTION OF THE DRAWING

These and other objects of the present invention will be readily understood with reference to the following specification and attached drawings, wherein:

FIG. 4 is a logic diagram for controlling aural warnings in accordance with the present invention.

DETAILED DESCRIPTION OFT HE INVENTION

Figure 1:
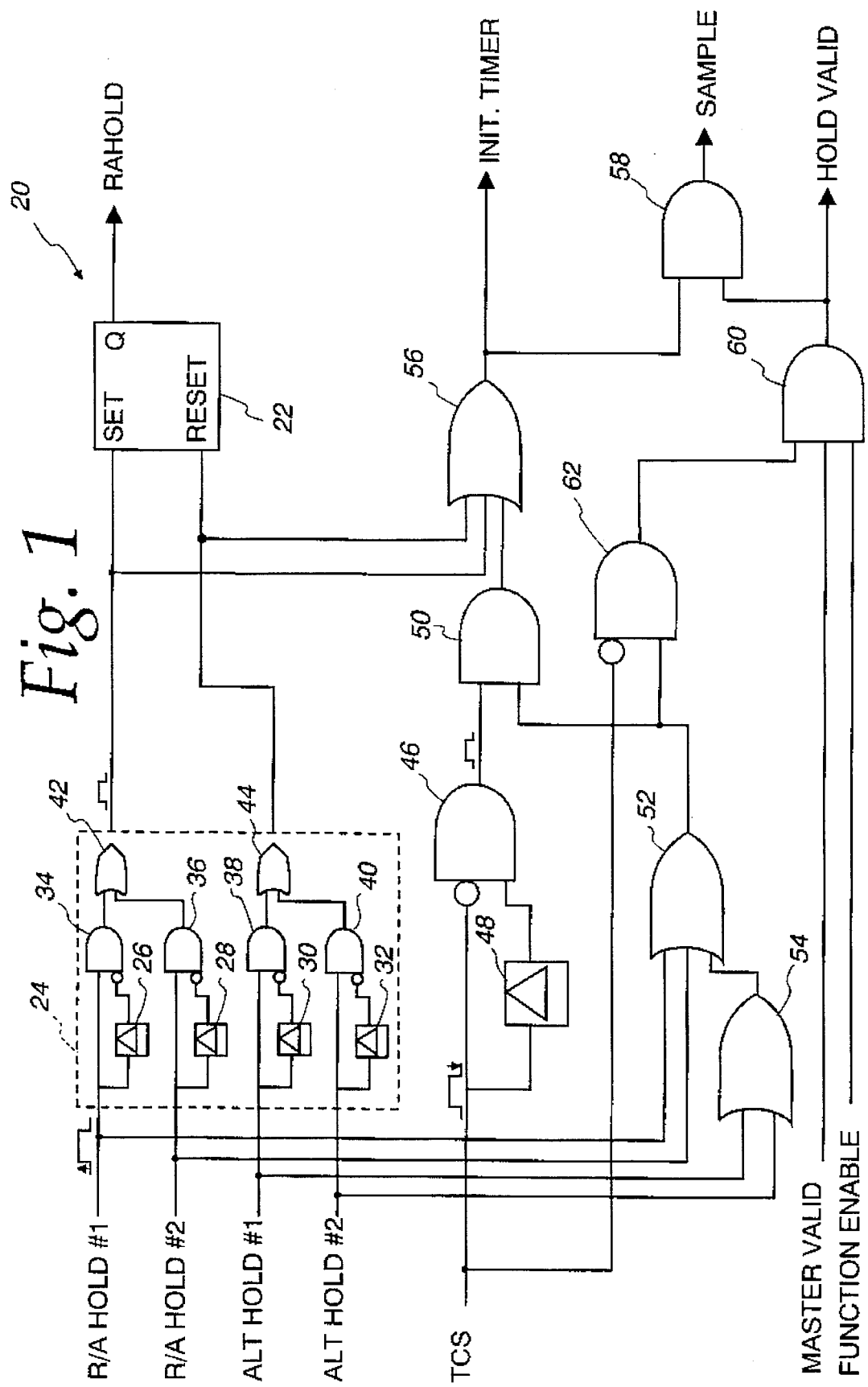
FIG. 1 is a logic diagram in accordance with the present invention which monitors the status of the radio altitude hold (R/A HOLD), barometric altitude hold (ALTITUDE HOLD) and touch-controlled steering (TCS) of an exemplary autopilot system.
Figure 2:
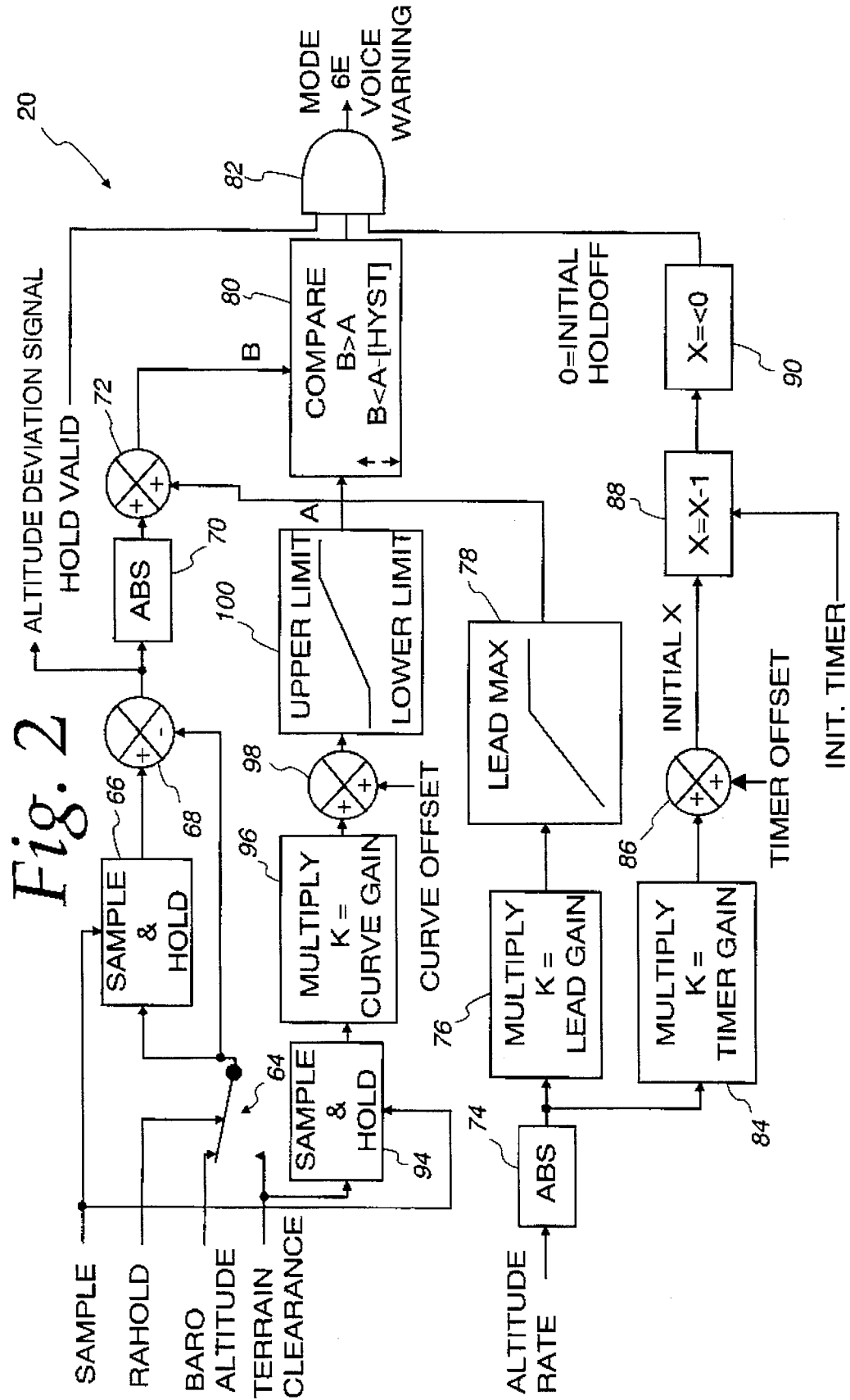
FIG. 2 is a logic diagram of the warning system in accordance with the present invention.

The warning system in accordance with the present invention is adapted to be used with an aircraft equipped with an autopilot system having a radio altitude hold (R/A HOLD) and/or a barometric altitude hold (ALTITUDE HOLD) function. The warning system, generally identified with the reference numeral 20, monitors the autopilot system and provides a warning when the actual radio altitude or barometric altitude exceeds the preselected altitudes by a predetermined amount. The warning system 20 is illustrated in FIGS. 1, 2 and 4 in functional or logic block diagram form as a series of gates, comparators and the like for purposes of illustration; however, it should be understood that the actual implementation of logic can be other than that as shown in FIGS. 1, 2 and 4 with various digital, analog and software implementations being possible.

The signals used by the warning system 20 include radio altitude, barometric altitude, barometric altitude rate, a MASTER VALID signal, used to inhibit the warning system when any of the instruments providing signals to the system are faulty, a configurable FUNCTION ENABLE signal which enables the warning system to be programmably disabled, and various autopilot system signals discussed below. Depending on the type of aircraft on which the warning system 20 is installed, the signals shown can be obtained from individual instruments, such as a barometric altimeter, a barometric altitude rate circuit, which generates an ALTITUDE RATE signal, and a radio altimeter. The barometric altitude rate signal also may be either an inertial velocity or an inertially corrected barometric altitude rate. In addition, when available, a global positioning system (GPS) altitude or an inertially derived barometric altitude can also be utilized. Alternatively, a portion of the signals may be obtained from a digital data bus in certain newer aircraft.

As discussed above, the warning system 20 also utilizes various signals from an autopilot system. The radio altitude hold (R/A HOLD) and barometric altitude hold (ALTITUDE HOLD) as well as the touch-controlled steering (TCS) signals illustrated in FIG. 1 are available from an autopilot system, for example, as developed by the Honeywell Corporation for a Fokker 50 type aircraft. However, the principles of the present invention are applicable to virtually any aircraft having an autopilot system with a radio altitude hold and/or barometric altitude hold function.

As mentioned above, the R/A HOLD function is normally used during low altitude flight maneuvers and is used to maintain the terrain clearance when either of the R/A HOLD control switches, R/A HOLD #1 or R/A HOLD #2, is placed in a R/A HOLD mode. Similarly, the ALTITUDE HOLD function maintains the current barometric altitude when the autopilot system is engaged and either of the ALTITUDE HOLD control switches, ALT HOLD #1 or ALT HOLD #2, is in an ALTITUDE HOLD mode. The touch-controlled steering (TCS) enables the pilot of an aircraft to adjust the radio altitude or barometric altitude while the autopilot system is engaged. The TCS signal provides an indication when the TCS system is active.

FIG. 1 illustrates the logic for determining when the autopilot system is engaged and whether the R/A HOLD or ALTITUDE HOLD functions have been selected. The logic circuitry in FIG. 1 also monitors the TCS in order to disable the warning system 20 when the TCS is active. More specifically, the logic circuitry illustrated in FIG. 1 monitors both of the R/A HOLD control switches, R/A HOLD #1 and R/A HOLD #2, and both of the ALT HOLD control switches, ALT HOLD #1 and ALT HOLD #2, and provides a signal when either of the R/A HOLD switches or ALT HOLD control switches are selected. More particularly, a latch 22, which may be implemented as a SET-RESET flip-flop, provides an indication at its Q output when either of the R/A HOLD control switches #1 or #2 or ALT HOLD control switches #1 or #2 are selected. More particularly, when either of the R/A HOLD #1 or R/A HOLD #2 control switches are selected, an active high RAHOLD signal will be generated at the Q output of the latch 22. Alternatively, when either of the ALT HOLD #1 or ALT HOLD #2 control switches are selected, the Q output of the latch 22 will be low. In order to determine when the R/A HOLD #1, R/A HOLD #2, ALT HOLD #1 or ALT HOLD #2 control switches are selected, signals from these control switches are applied to a rising edge trigger detector circuit, shown within the dashed box 24. Normally, the signals R/A HOLD #1, R/A HOLD #2, ALT HOLD #1 and ALT HOLD #2 are low when the control switches are not selected. When either of the control switches is selected, the signal corresponding to the switch selected (i.e. R/A HOLD #1, R/A HOLD #2, ALT HOLD #1 or ALT HOLD #2) goes high. These signals R/A HOLD #1, R/A HOLD #2, ALT HOLD #1 and ALT HOLD #2 are applied to the rising edge trigger detector circuit 24, which includes four sample-and-hold circuits 26, 28, 30 and 32, four AND gates 34, 36, 38 and 40 and two OR gates 42 and 44. Each of the control switch signals R/A HOLD #1, R/A HOLD #2, ALT HOLD #1 and ALT HOLD #2 is applied to a non-inverting input of the AND gates 34, 36, 38 and 40, respectively. The control switch signals R/A HOLD #1, R/A HOLD #2, ALT HOLD #1 and ALT HOLD #2 are also applied to the sample-and-hold circuits 26, 28, 30 and 32, respectively. The outputs of the sample-and-hold circuits 26, 28, 30 and 32 are applied to inverting inputs of the AND gates 34, 36, 38 and 40.

Normally, when none of the control switches R/A HOLD #1, R/A HOLD #2, ALT HOLD #1 and ALT HOLD #2 are selected, the AND gates 34, 36, 38 and 40 will be disabled. Once one of the control switches R/A HOLD #1, R/A HOLD #2, ALT HOLD #1 or ALT HOLD #2 is selected, the signal from the selected control switch is applied to the non-inverting input of the respective AND gate 34, 36, 38 or 40 while the signals applied to the inverting inputs of the AND gates 34, 36, 38 and 40 will remain low while the sample-and-hold circuits 26, 28, 30 and 32 are charging, thus enabling the AND gate 34, 36, 38 and 40 corresponding to the selected control switch R/A HOLD #1, R/A HOLD #2, ALT HOLD #1 or ALT HOLD #2.

As mentioned above, the system is enabled when either of the R/A HOLD #1 or R/A HOLD #2 control switches is selected to generate the active high RAHOLD signal at the Q output of the latch 22. Thus, the outputs of the AND gates 34 and 36 are applied to the OR gate 42, whose output, in turn, is applied to the SET input of the latch 22. Thus, when either the R/A HOLD #1 or R/A HOLD #2 control switch is selected, the AND gates 34 or 36 will be enabled, which, in turn, set the latch 22. Once the latch 22 is set, the active high R/A HOLD signal will be available at the Q output of the latch 22.

Similarly, the system is also active when either of the ALT HOLD #1 or ALT HOLD #2 control switches are selected. Thus, the outputs of the AND gates 38 and 40 are applied to the OR gate 44, whose output, in turn, is applied to the RESET input of the latch 22. Thus, when either of the ALT HOLD #1 or ALT HOLD #2 control switches is selected, the RAHOLD signal, available at the Q output of the latch 22, will be low to indicate that the ALT HOLD function was selected.

In order to avoid spurious warnings, the warning system 20 is disabled when the touch-controlled steering (TCS) system is active. In particular, a signal TCS, normally low when the TCS system is inactive, is used to initiate a timer to disable the warning system 20 while the aircraft is stabilizing on a hold altitude. More specifically, the TCS signal is applied to a falling edge detector circuit which includes an AND gate 46 and a sample-and-hold circuit 48. More particularly, the TCS signal is applied to an inverting input of the AND gate 46, as well as to the sample-and-hold circuit 48, whose output, in turn, is applied to a non-inverting input of the AND gate 46. During conditions when the TCS system is non-active, the AND gate 46 will be disabled. Once the TCS system is engaged, the AND gate 46 will be enabled after the TCS signal goes low, which indicates that the TCS is inactive, while the sample-and-hold circuit 48 is discharging. The output of the AND gate 46, which represents whether the TCS system is active, is applied to an AND gate 50, along with signals available at an output of an OR gate 52, which represents that one of the control switches R/A HOLD #1, R/A HOLD #2, ALT HOLD #1 or ALT HOLD #2 has been selected. More particularly, the signals R/A HOLD #1 and R/A HOLD #2 are applied to the inputs of the OR gate 52 and ORed with the output of an OR gate 54. The output of the OR gate 54 represents that one of the ALT HOLD #1 or ALT HOLD #2 control switches has been selected. As such, the signals ALT HOLD #1 and ALT HOLD #2 are applied to the inputs of the OR gate 54. Thus, the output of the AND gate 50 represents that the TCS system is active and one of the control switches R/A HOLD #1, R/A HOLD #2, ALT HOLD #1 or ALT HOLD #2 has been selected. The output of the AND gate 50 is applied to one input of an OR gate 56. As such, anytime the TCS system is active and one of the control switches R/A HOLD #1, R/A HOLD #2, ALT HOLD #1 or ALT HOLD #2 has been selected, the output of the OR gate 56 will be high to initiate a timer to temporarily disable the warning system while the aircraft is stabilizing on a particular hold altitude. The OR gate 56 is also high when either of the control switches R/A HOLD #1, R/A HOLD #2, ALT HOLD #1 or ALT HOLD #2 is selected to temporarily disable the warning system 20 while the aircraft is stabilizing on a particular altitude level.

An AND gate 58 is used to initiate sampling of either the radio altitude or barometric altitude when any of the control switches R/A HOLD #1, R/A HOLD #2, ALT HOLD #1 or ALT HOLD #2 are selected as long as the TCS system is inactive. The output of the OR gate 56, which indicates that one of the control switches R/A HOLD #1, R/A HOLD #2, ALT HOLD #1 or ALT HOLD #2 or that the TCS system has been selected, is applied to one input of the AND gate 58. In order to prevent samples from being taken when the TCS system is active, the AND gate 58 is under the control of an AND gate 60, which, in turn, is under the control of an AND gate 62. The output of the OR gate 52, which indicates that one of the control switches R/A HOLD #1, R/A HOLD #2, ALT HOLD #1 or ALT HOLD #2 was selected, is applied to one input of the AND gate 62. The TCS signal is applied to an inverting input of the AND gate 62. As indicated above, the TCS signal is normally low and goes high when the TCS system is active. Thus, anytime the TCS system is active, the AND gate 62, and, in turn, the AND gates 58 and 60 are disabled to prevent samples of either the radio altitude or barometric altitude from being taken when the TCS system is active. Alternatively, when the TCS system is inactive, the AND gate 62 will be enabled, placing the AND gate 60 under the control of a MASTER VALID signal and a configurable FUNCTION ENABLE signal, which are ANDed with the output of the AND gate 62. As mentioned above, the MASTER VALID signal will be high unless one of the instruments supplying data to the system becomes faulty, in which case the AND gate 60, and in turn, the AND gate 58, will be disabled. The FUNCTION ENABLE signal is a configurable signal, used to either enable or disable the system, for example, under program control, to enable the system to be disabled for different aircraft or different conditions. For a Fokker 50 type aircraft, the FUNCTION ENABLE signal is tied high, placing the AND gate 60 under the control of the AND gate 62 and the MASTER VALID signal.

The warning system 20, in accordance with the present invention, is illustrated in FIG. 2. As will be discussed in more detail below, the system 20 generates a warning whenever the radio altitude or barometric altitude of the aircraft varies from the selected altitude by a predetermined amount when the autopilot system is engaged and either the R/A HOLD or ALTITUDE HOLD functions are selected. As discussed above, anytime the R/A HOLD function is selected by selecting one or both of the R/A HOLD #1 or R/A HOLD #2 control switches, the RAHOLD signal will be high. The RAHOLD signal is used to control a single-pole, double-throw switch 64 to enable the present terrain clearance or barometric altitude to be sampled and stored in a sample-and-hold circuit 66 under the control of the SAMPLE signal. As indicated above, the SAMPLE signal will be active high when any of the control switches R/A HOLD #1, R/A HOLD #2, ALT HOLD #1 or ALT HOLD #2 is selected and the TCS system is not active. During such conditions, the terrain clearance or barometric altitude is sampled and stored in the sample-and-hold circuit 66 to establish a reference altitude or datum. The reference altitude, available at the output of the sample-and-hold circuit 66, is applied to a positive input of a summing junction 68 and compared with the current terrain clearance or barometric altitude, which is applied to a negative input of the summing junction 68. The output of the summing junction 68, which represents the difference between the reference terrain clearance or barometric altitude and the current terrain clearance or barometric altitude (altitude deviation signal) is applied to an absolute value circuit 70, which, in turn, is applied to a positive input of a summing junction 72 and summed with an altitude rate bias signal to produce a biased altitude deviation signal B.

The altitude rate bias signal is derived from the ALTITUDE RATE signal, which is applied to an absolute value circuit 74, which produces a positive altitude rate signal at its output for both positive and negative values of the ALTITUDE RATE signal. The output of the absolute value circuit 74, in turn, is multiplied by a configurable LEAD GAIN constant by way of a multiplier 76. The LEAD GAIN constant is a configurable constant and is selected based on particular aircraft types. For a Fokker 50 type aircraft, the LEAD GAIN constant is selected as 0.085. The output of the multiplier 76 is applied to a limiter circuit 78, which limits the output of the multiplier circuit 76 to a configurable value, identified as LEAD MAX. For a Fokker 50 type aircraft, the LEAD MAX constant is selected to be 200. The output of the limiter 78, which represents the altitude rate bias, is applied to a positive input of the summing junction 72 to bias the altitude deviation signal. The output of the summing junction 72, which represents a biased altitude deviation signal B, is then compared with the warning envelope illustrated in FIG. 3, identified as the signal A (as discussed below), by way of a comparator 80.

Figure 3:
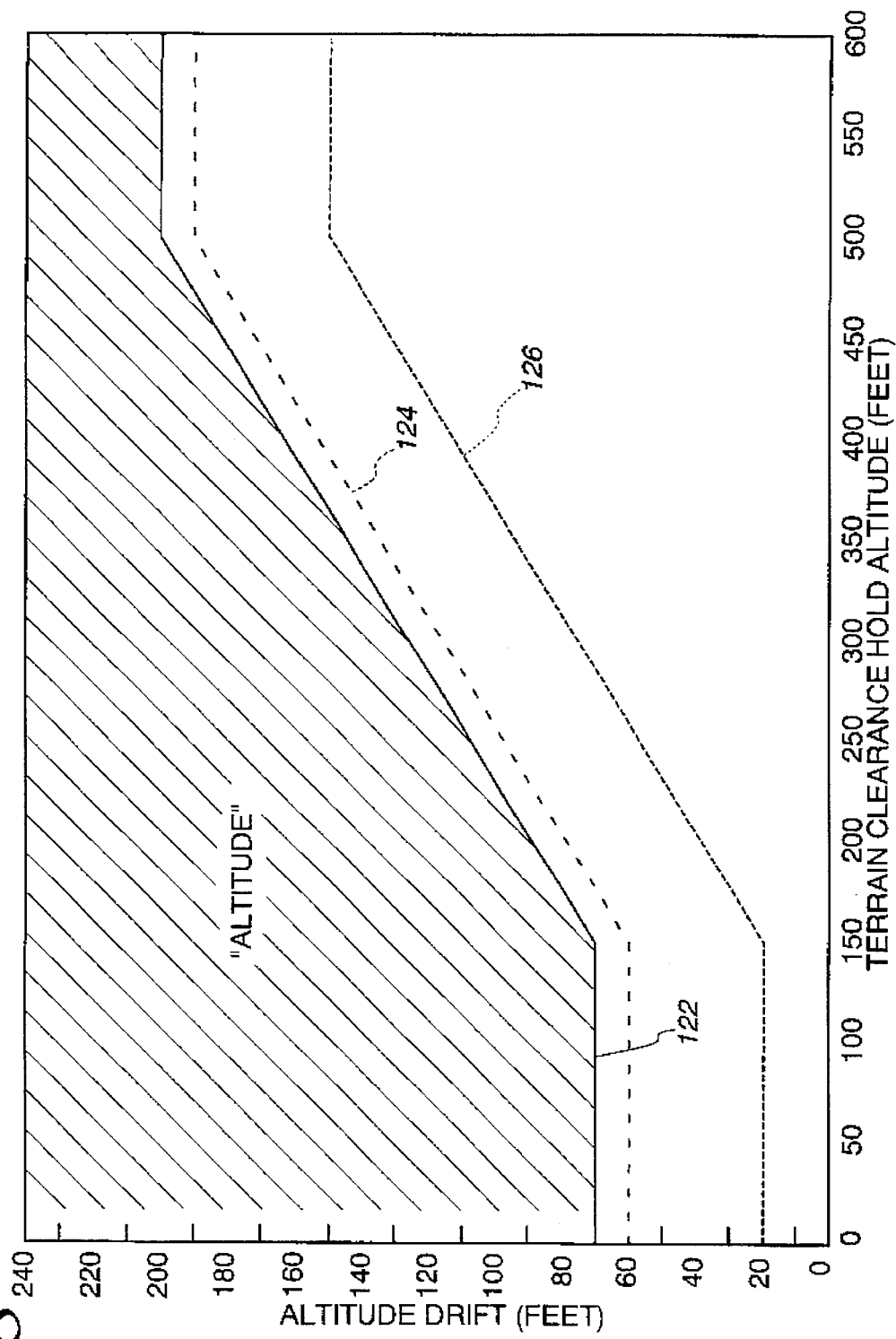
FIG. 3 is a graphical illustration of an exemplary warning envelope in accordance with the present invention.

Whenever the biased altitude deviation signal B is inside the warning envelope illustrated in FIG. 3, the output of the comparator 80 will be high. As illustrated in FIG. 3, hysteresis is built into the warning envelope. More particularly, the output of the comparator 80 will remain high until the biased altitude deviation signal B is less than the difference between envelope signal A and a configurable HYSTERESIS constant. For a Fokker 50 aircraft, the HYSTERESIS constant is selected as 10. The output of the comparator 80 is applied to an AND gate 82, whose output represents the warning signal, identified as the MODE 6E VOICE WARNING signal. A HOLD VALID signal, available at the output of the AND gate 60 (FIG. 1) is applied to one input of the AND gate 82 (FIG. 2). The HOLD VALID signal, as discussed below, will disable the AND gate 82, and thus the warning system, whenever the TCS system is active, the MASTER VALID signal is low, or the configurable FUNCTION ENABLE signal is low.

The AND gate 82 is also under the control of a timer circuit as indicated below, which disables the warning system 20 while the aircraft is stabilizing its hold altitude after the TCS system has been active or after the R/A HOLD or ALT HOLD functions have been selected. More particularly, the absolute value of the ALTITUDE RATE, available at the output of the absolute value circuit 74, is multiplied by a multiplier 84 having a configurable multiplication constant TIMER GAIN. The output of the multiplier circuit 84 is applied to a positive input of a summing junction 86, along with a configurable constant TIMER OFFSET. For a Fokker 50 type aircraft, the TIMER GAIN and TIMER OFFSET constants are selected as 0. Thus, the output of the summing junction 86, identified as INITAL X, is initially 0. The output of the summing junction 86 is applied to a counter circuit 88. The counter circuit 88 is under the control of the INITIATE TIMER signal, available at the output of the OR gate 56 (FIG. 1), which indicates that one of the switches R/A HOLD #1, R/A HOLD #1, ALT HOLD #1 or ALT HOLD #2 have been selected or the TCS system is active. This signal INITIATE TIMER, when active, is used to load the counter circuit 88 with its initial value. This signal INITIATE TIMER, when inactive, is used to decrement the counter circuit 88. The output of the counter circuit 88 is applied to a comparator circuit 90 which compares the output of the counter circuit 88 with 0. During conditions when the INITIATE TIMER signal is inactive, the counter is allowed to count down. When the output of the counter 88 reaches 0 or is negative, the output of comparator circuit 90 goes active. During this condition, the comparator 80 will place the AND gate 82 under the control of the comparator 80 and the HOLD VALID signal as discussed above.

The warning envelope illustrated in FIG. 3 is generated by circuitry (seen in FIG. 2) which includes a sample-and-hold circuit 94, a multiplier circuit 96, a summing junction 98 and a limiter 100. At the same time that the reference terrain clearance or barometric altitude is captured by the sample-and-hold circuit 66 as discussed above, the current terrain clearance is captured by the sample-and-hold circuit 94 and multiplied by a configurable constant CURVE GAIN by way of a multiplier 96 and applied to a positive input of the summing junction 98. Another configurable constant CURVE OFFSET is applied to another positive input of the summing junction 98. As mentioned above, the constants CURVE GAIN and CURVE OFFSET are configurable constants, which are selected according to the particular aircraft type. For a Fokker 50 type aircraft, the CURVE GAIN constant may be selected as 0.329 while the CURVE OFFSET constant may be selected as 35.7.

The output of the summing junction 98 is applied to the limiter 100. The limiter 100 has a configurable UPPER LIMIT constant and a configurable LOWER LIMIT constant. For a Fokker 50 type aircraft, the UPPER LIMIT constant may be selected as 200 feet, while the LOWER LIMIT constant may be selected as 85 feet. The output of the limiter 100 represents the warning envelope shown cross-hatched in FIG. 3 and identified in FIG. 2 as the signal A. As indicated above, the warning envelope A is compared with the absolute deviation or altitude drift by way of the comparator 80 in order to generate a MODE 6E VOICE WARNING signal.

The MODE 6E VOICE WARNING signal is used to generate a continuous "ALTITUDE" voice warnings separated by predetermined pauses. In order to inhibit spurious warnings, the aural warnings are inhibited during recovery conditions. For example, when the altitude rate is either less than −200 feet per minute (FPM) or greater than +200 FPM. More particularly, referring to FIG. 4, the MODE 6E VOICE WARNING signal is used to control a sample-and-hold circuit 102. The sample-and-hold circuit 102 samples the ALTITUDE DEVIATION signal and compares the sampled value with a reference value, for example, 0 feet by way of a comparator 104. The output of the comparator 104 will be high when the sampled ALTITUDE DEVIATION SIGNAL is less than 0 feet, which indicates that the aircraft is ascending when the AND gate 82 (FIG. 2) is enabled. When the sampled ALTITUDE DEVIATION SIGNAL is either equal to 0 feet or greater than 0 feet, indicating that the aircraft is descending, the output of the comparator 104 will be low. The output of the comparator 104 is applied to an AND gate 105. Thus, when the aircraft is descending when a warning is issued, the AND gate 105 will be disabled. The output of the AND gate 105 is applied to an inverting input of an AND gate 106 and ANDed with the MODE 6E VOICE WARNING signal. As long as no recovery is being initiated, the AND gate 106 will be enabled to generate a continuous altitude voice warning. More particularly, the output of the AND gate 106 is applied to a voice generator 108, preferably a digital voice generator, which generates a continuous "ALTITUDE" voice warning separated by a predetermined pause, for example 2.25 seconds. The output of the voice generator 108 is, in turn, applied to a headphone or loudspeaker 110.

In the event that a deliberate recovery is initiated (i.e. the altitude rate is less than −200 FPM or greater than +200 FPM) the AND gate 106 and, in turn, the digital voice generator 108 will be disabled by either the AND gate 105 or an AND gate 112. More particularly, the ALTITUDE RATE signal is compared with a signal representative of −200 FPM by way of a comparator 114. Whenever the altitude rate is less than −200 FPM, a timer 116 is initiated. After a predetermined delay, representative of a deliberate recovery, for example 0.4 seconds, the output of the timer 116 will be high. The output of the timer 116 is ANDed with the output of the comparator 104 by way of the AND gate 105. Thus, anytime the ALTITUDE RATE is less than −200 FPM, which indicates a recovery, the AND gate 105 will be enabled after the delay period of the timer 116, which, in turn, will disable the AND gate 106 and, in turn, the digital voice generator 108.

Similarly, the ALTITUDE RATE signal is compared by way of a comparator 118 with a reference positive ALTITUDE RATE signal, for example +200 FPM. Whenever the ALTITUDE RATE is greater than 300 FPM, the comparator 118 will enable a timer 120. After the delay period set by the timer 120, the output of the timer 120 will be high. The output of the timer 120, which represents a recovery of greater than 200 FPM, is applied to one input of the AND gate 112. The output of the comparator 104 is applied to an inverting input of the AND gate 112. The output of the comparator 104 will be low when the sampled ALTITUDE DEVIATION SIGNAL indicates a descent when the AND gate 82 (FIG. 2) is initially enabled. During conditions when a recovery of greater than 200 FPM is initiated, the output of the AND gate 112 will be high, which will disable the AND gate 106 to inhibit the digital voice generator 108 during these conditions.

The warning envelope is illustrated in FIG. 3 and is represented by the cross-hatched portion. The solid line 122 represents the lower warning boundary as determined by the limiter 100 (FIG. 2). The dashed line 124 represents the hysteresis as determined by the configurable HYSTERESIS constant discussed above. The dashed line 126 represents altitude rate bias at 1000 FPM using values for the configurable constants LEAD MAX and LEAD GAIN as discussed above.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An altitude warning system for an aircraft having an autopilot altitude hold function with one or more predetermined selectable flight parameters, each predetermined selectable flight parameter having a selectable value which is automatically maintained when the selectable flight parameter is selected and the autopilot is engaged, the warning system comprising:

means for receiving signals representative of said one or more predetermined flight parameters;

means for monitoring the current value of a selected predetermined flight parameter;

means for comparing the current value of said selected flight parameter with the selected value of said selected flight parameter;

means responsive to said comparing means for generating an altitude deviation warning signal when the current value of the selected flight parameter deviates from the selected value of said selected flight parameter by more than a predetermined amount.

2. An altitude warning system as recited in claim 1, further including means for inhibiting said generating means under predetermined conditions.

3. An altitude warning system as recited in claim 1, wherein one of said one or more predetermined flight parameters is radio altitude.

4. An altitude warning system as recited in claim 1, wherein one of said one or more predetermined flight parameters is barometric altitude.

5. A warning system for an aircraft having an autopilot system with one or more predetermined selectable flight parameters, each predetermined selectable flight parameter having a selectable value which is automatically maintained when the selectable flight parameter is selected andthe autopilot is engaged, the warning system comprising:

means for receiving signals representative of said one or more predetermined flight parameters;

means for monitoring the current value of a selected predetermined flight parameter;

means for comparing the current value of said Selected flight parameter with the selected value of said selected flight parameter;

means responsive to said comparing means for generating a warning signal when the current value of the selected flight parameter deviates from the selected value of said selected flight parameter by more than a predetermined amount; and further including means for receiving a signal representative of the barometric altitude rate and means for inhibiting said generating means when said barometric altitude rate exceeds a predetermined value.

6. A warning system for an aircraft having an autopilot system with one or more predetermined selectable flight parameters, each predetermined selectable flight parameter having a selectable value which is automatically maintained when the selectable flight parameter is selected and the autopilot is engaged, the warning system comprising:

means for receiving signals representative of said one or more predetermined flight parameters;

means for monitoring the current value of a selected predetermined flight parameter;

means for comparing the current value of said selected flight parameter with the selected value of said selected flight parameter;

means responsive to said comparing means for generating a warning signal when the current value of the selected flight parameter deviates from the selected value of said selected flight parameter by more than a predetermined amount; and further including means for receiving a signal representative of the barometric altitude rate and means for inhibiting said generating means when said barometric altitude rate is less than a predetermined value.

7. A warning system for an aircraft having an autopilot system with one or more predetermined selectable flight parameters, each predetermined selectable flight parameter having a selectable value which is automatically maintained when the selectable flight parameter is selected and the autopilot is engaged, the warning system comprising:

means for receiving signals representative of said one or more predetermined flight parameters;

means for monitoring the current value of a selected predetermined flight parameter;

means for comparing the current value of said selected flight parameter with the selected value of said selected flight parameter;

means responsive to said comparing means for generating a warning signal when the current value of the selected flight parameter deviates from the selected value of said selected flight parameter by more than a predetermined amount wherein said autopilot system includes means for varying the selected values of the selected flight parameter after said autopilot system is engaged and said warning system includes means for monitoring said varying means and inhibiting said generating means for a predetermined period when said selected values are varied after said autopilot system is engaged.

8. A warning system for an aircraft comprising:

means for monitoring a predetermined aircraft altitude signal;

means for comparing said predetermined altitude signal with a predetermined value of said predetermined altitude signal during predetermined conditions; and means for generating an altitude deviation warning signal when the current value of said predetermined altitude signal varies from said predetermined value of said predetermined altitude signal by more than a predetermined amount.

9. A warning system as recited in claim 8, further including means for biasing said predetermined value.

10. A warning system as recited in claim 8, wherein said predetermined altitude signal is radio altitude.

11. A warning system as recited in claim 8, wherein said predetermined altitude signal is barometric altitude.

12. A warning system as recited in claim 8, further including means for inhibiting said generating during predetermined conditions.

13. A warning system for an aircraft comprising:

means for monitoring a predetermined flight parameter of the aircraft;

means for comparing said predetermined flight parameter with a predetermined value of said predetermined flight parameter during predetermined conditions; and means for generating a warning signal when the current value of said predetermined flight parameter varies from said predetermined value of said predetermined flight parameter by more than a predeter mined amount;

means for biasing said predetermined value; and means for receiving signals representative of the barometric altitude rate of the aircraft and said biasing means biases said predetermined value as a function of said barometric altitude rate.

14. A warning system for an aircraft comprising:

means for monitoring a predetermined flight parameter of the aircraft;

means for comparing said predetermined flight parameter with a predetermined value of said predetermined flight parameter during predetermined conditions: and means for generating a warning signal when the current value of said predetermined flight parameter varies from said predetermined value of said predetermined flight parameter by more than a predetermined amount; and further including means for receiving signals representative of the barometric altitude rate of the aircraft and inhibiting said generating means as a function of the barometric altitude rate.

15. A terrain warning device for aircraft having an autopilot altitude hold function comprising:

means for detecting a deviation from a preselected altitude desired to be maintained by the autopilot; and means, coupled to said means for detecting, for generating a warning when said deviation exceeds a predetermined amount.

* * * * *

UNITED STATES PATENT AND TRADEMARK OFFICE
CERTIFICATE OF CORRECTION

PATENT NO. : 5,585,791

DATED : December 17, 1996

INVENTOR(S) : Noel S. Paterson; Scott R. Gremmert; and Gary A. Ostrom

It is certified that error appears in the above-identified patent and that said Letters Patent is hereby corrected as shown below:

IN THE CLAIMS:

Delete the published text of Claims 3, 4, 5, 6 and 10. The correct text for Claims 3, 4, 5, 6 and 10 is as follows:

3. A warning system for an aircraft having an autopilot system with one or more predetermined selectable flight parameters, each predetermined selectable flight parameter having a selectable value which is automatically maintained when the selectable flight parameter is selected and the autopilot is engaged, the warning system comprising:

means for receiving signals representative of said one or more predetermined flight parameters;

means for monitoring the current value of a selected predetermined flight parameter;

means for comparing the current value of said selected flight parameter with the selected value of said selected flight parameter;

means responsive to said comparing means for generating a warning signal when the current value of the selected flight parameter deviates from the selected value of said selected flight parameter by more than a predetermined amount; and further including means for receiving a signal representative of the barometric altitude rate and means for inhibiting said generating means when said barometric altitude rate exceeds a predetermined value.

4. A warning system for an aircraft having an autopilot system with one or more predetermined selectable flight parameters, each predetermined selectable flight parameter having a selectable value which is automatically maintained when the selectable flight parameter is selected and the autopilot is engaged, the warning system comprising:

means for receiving signals representative of said one or more predetermined flight parameters;

means for monitoring the current value of a selected predetermined flight parameter;

means for comparing the current value of said selected flight parameter with the selected value of said selected flight parameter;

UNITED STATES PATENT AND TRADEMARK OFFICE
CERTIFICATE OF CORRECTION

PATENT NO.   : 5,585,791

DATED        : December 17, 1996

INVENTOR(S)  : Noel S. Paterson; Scott R. Gremmert; and Gary A. Ostrom

It is certified that error appears in the above-identified patent and that said Letters Patent is hereby corrected as shown below:

IN THE CLAIMS:

means responsive to said comparing means for generating a warning signal when the current value of the selected flight parameter deviates from the selected value of said selected flight parameter by more than a predetermined amount; and further including means for receiving a signal representative of the barometric altitude rate and means for inhibiting said generating means when said barometric altitude rate is less than a predetermined value.

5. An altitude warning system as recited in claim 1, wherein one of said one or more predetermined flight parameters is radio altitude.

6. An altitude warning system as recited in claim 1, wherein one of said one or more predetermined flight parameters is barometric altitude.

10. A warning system for an aircraft comprising:
   means for monitoring a predetermined flight parameter of the aircraft;
   means for comparing said predetermined flight parameter with a predetermined value of said predetermined flight parameter during predetermined conditions; and
   means for generating a warning signal when the current value of said predetermined flight parameter varies from said predetermined value of said predetermined flight parameter by more than a predetermined amount;
   means for biasing said predetermined value; and
   means for receiving signals representative of the barometric altitude rate of the aircraft and said biasing means biases said predetermined value as a function of said barometric altitude rate.

UNITED STATES PATENT AND TRADEMARK OFFICE
CERTIFICATE OF CORRECTION

PATENT NO. : 5,585,791

DATED : December 17, 1996

INVENTOR(S) : Noel S. Paterson; Scott R. Gremmert; and Gary A. Ostrom

It is certified that error appears in the above-indentified patent and that said Letters Patent is hereby corrected as shown below:

Claim 11, line 2 (column 10, line 50): delete [barometric] and substitute therefore -- radio--.

Delete the published text of Claims 12, 13 and 14. The correct text for Claims 12, 13, and 14 is as follows:

12. A warning system as recited in claim 8, wehrein said predetermined altitude signal is barometric altitude.

13. A warning system for an aircraft comprising:

means for monitoring a predetermined flight parameter of the aircraft;

means for comparing said predetermined flight parameter with a predetermined value of said predetermined flight parameter during predetermined conditions; and means for generating a warning signal when the current value of said predetermined flight parameter varies from said predetermined value of said predetermined flight parameter by more than a predetermined amount; and further including means for receiving signals representative of the barometric altitude rate of the aircraft and inhibiting said generating means as a function of the barometric altitude rate.

UNITED STATES PATENT AND TRADEMARK OFFICE
CERTIFICATE OF CORRECTION

PATENT NO. : 5,585,791

DATED : December 17, 1996

INVENTOR(S) : Noel S. Paterson; Scott R. Gremmert; and Gary A. Ostrom

It is certified that error appears in the above-indentified patent and that said Letters Patent is hereby corrected as shown below:

14. A warning system as recited in claim 8, further including means for inhibiting said generating during predetermined conditions.

Signed and Sealed this

Second Day of September, 1997

*Attest:*

*Attesting Officer*

BRUCE LEHMAN

*Commissioner of Patents and Trademarks*